MAJORITY LOGIC BINARY ADDER

Filed Nov. 17, 1965

INVENTOR
ROBERT BETTS
BY Thomas & Thomas
ATTORNEYS

United States Patent Office 3,440,413

Patented Apr. 22, 1969

3,440,413

MAJORITY LOGIC BINARY ADDER

Robert Betts, Vestal, N.Y., assignor to International Business Machines Corporation, Armonk, N.Y., a corporation of New York Filed Nov. 17, 1965, Ser. No. 508,215

Int. Cl. G06f *7/385*

U.S. Cl. 235—176 7 Claims

ABSTRACT OF THE DISCLOSURE

A majority logic binary adder having a plurality of stages with each stage having a first majority circuit which responds to inputs $A_x$, $B_x$, and $C_x$ and provides an output carry signal $C_{x+1}$ to the next higher order stage, a majority circuit which responds to inputs $A_x$, $B_x$, $C_x$, $C_{x+1}$, and $C_{x+1}$ and provides an output sum signal $S_x$, and means coupling the output carry signal $C_{x+1}$ as a double input to the second majority circuit.

This invention relates to an arithmetic device and more particularly to a binary adder.

Much development effort has been devoted in recent times to making adders faster in operation and simple in construction. The ripple of carries from stage to stage in a parallel adder arrangement constitutes one source of delay in generating a final sum. This source of time delay has been alleviated in part by the use of carry look-ahead circuits, but any saving in time by this technique involves an increase in equipment and a consequent increase in cost.

Accordingly, it is a feature of this invention to minimize the time for carry ripple through a plurality of adder stages, yet provide an arrangement of adder stages which are simple in construction, fast in operation, and less expensive to manufacture and maintain.

It is a feature of this invention to provide an improved adder the speed of which is in the order of 20 nanoseconds or less per adder stage without the use of carry lookahead circuits.

It is another feature of this invention to provide an improved adder arrangement which utilizes two majority circuits per stage, one to generate a sum and the other to generate a carry to the next high order stage.

It is a further feature of this invention to provide an adder arrangement with a plurality of adder stages wherein each stage includes improved logic for determining a correct sum.

In one arrangement according to this invention an improved adder arrangement is provided which includes a plurality of stages with each stage having two majority circuits. The first of the majority circuits has three inputs and receives binary inputs $A_x$, $B_x$ and a carry input $C_x$ and provides an output signal representing a carry $C_{x+1}$ to the higher order stage. The second of the majority circuits has five inputs and receives binary inputs $A_x$, $B_x$ and a carry input $C_x$ on three of its inputs. The carry output $C_{x+1}$ is supplied from the first majority circuit to the two remaining inputs of the second majority circuit. The second majority circuit includes provision which in essence inverts the inputs $C_{x+1}$ and $C_{x+1}$ to $\overline{C}_{x+1}$ and $\overline{C}_{x+1}$. The second majority circuit provides an output signal having a polarity which represents the polarity of the majority of the input signals $A_x$, $B_x$, $C_x$, $\overline{C}_{x+1}$ and $\overline{C}_{x+1}$. The second majority circuit may be viewed alternatively as a device which responds to the inputs $C_{x+1}$, $C_{x+1}$ to provide an output signal which has a polarity which is the inverse of the polarity of the majority of the input signals $A_x$, $B_x$ and $C_x$ except in the cases where $A_x$, $B_x$ and $C_x$ are alike. The majority circuits are pulse operated, and in order to save time, the majority circuit which generates a sum in one stage is pulse operated simultaneously with the majority circuit for generating a carry out in the next high order stage. The staggering of timed pulses for this purpose may be accomplished by utilizing a transmission line to provide pulses of the appropriate polarity and timing relationship.

The foregoing and other objects, features and advantages of the invention will be apparent from the following more particular description of a preferred embodiment of the invention, as illustrated in the accompanying drawings.

Figure 1:
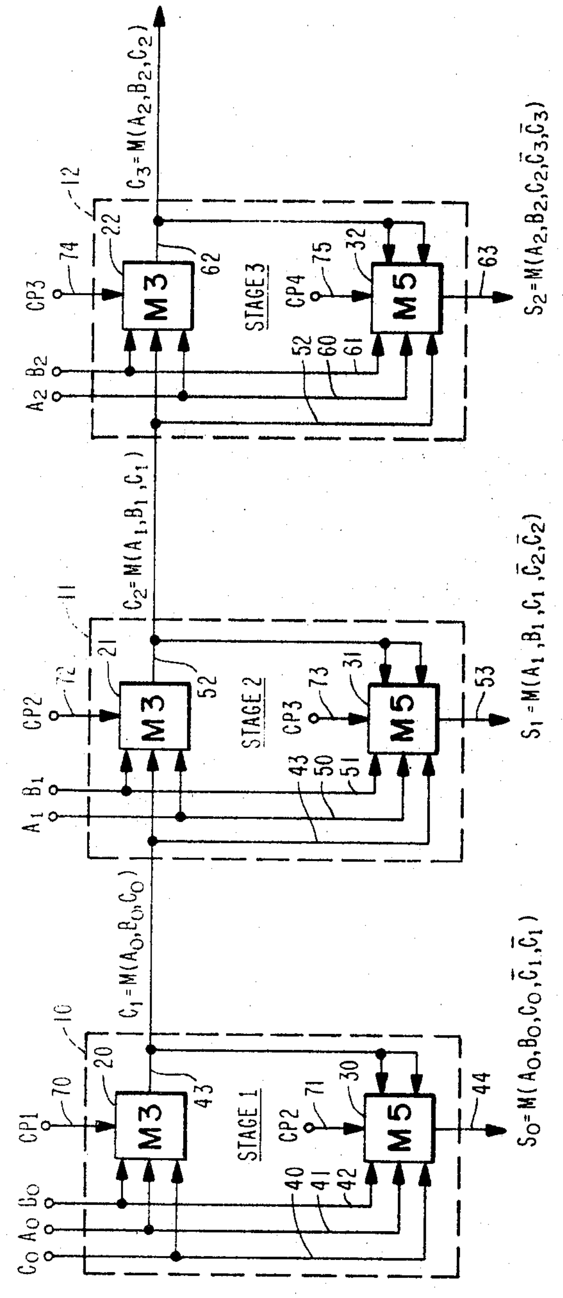
FIGURE 1 is a block schematic of an adder arrangement according to this invention.

Reference is made to FIGURE 1 which illustrates a three stage adder arrangement constructed according to this invention, Stages 10, 11 and 12 each include a three input majority (M3) circuit and a five input majority (M5) circuit. Stages 10, 11, and 12 include respective three input majority circuits 20 through 22 and respective five input majority circuits 30 through 32. Carry input $C_o$ to the stage 10 is a constant negative signal, representing binary zero, which is applied on a line 40 to the majority circuits 20 and 30. Signals representing a binary input $A_o$ are applied on a line 41 to the majority circuits 20 and 30, and signals representing a binary input $B_o$ are applied on a line 42 to the majority circuits 20 and 30. The majority circuit 20 has an output on a line 43 which represents a carry $C_1$, and this signal is supplied to two different points in the majority circuit 30 as explained more fully hereinafter. The carry output signal on the line 43 is connected to the majority circuits 21 and 31 of the next higher order stage 11. The carry $C_1$ is a positive signal representing a binary one whenever two or more of the inputs $A_o$, $B_o$, and $C_o$, are positive signals representing binary ones. The equation for expressing this logic is $C_1=M(A_o, B_o, C_o)$ which is depicted in the drawing along the carry output line 43. The majority circuit 30 in stage 10 establishes an output signal on a line 44 representing a sum $S_o$. The sum $S_o$ is a binary one whenever three or more of the inputs $A_o$, $B_o$, $C_o$, $\overline{C}_1$, $\overline{C}_1$ are positive signals representing binary ones. The equation which expresses this logic is $$S_o=M(A_o, B_o, C_o, \overline{C}_1, \overline{C}_1)$$

which is depicted in the drawing near the output line 44.

The stage 11 receives signals representing binary inputs $A_1$ and $B_1$ on respective lines 50 and 51, and these signals are coupled to the majority circuits 21 and 31. The majority circuit 21 provides an output signal on a line 52 representing a carry $C_2$, and the carry signal is conveyed on the line 52 to the majority circuits 22 and 32 of stage 12. The carry signal on the line 52 is coupled to two different points in the majority circuit 31 in stage 11 as explained more fully hereinafter. The output of the majority circuit 31 is a signal on the line 53 representing a sum $S_1$.

Stage 12 receives signals representing binary inputs $A_2$ and $B_2$ which are conveyed along respective lines 60 and 61 to the majority circuits 22 and 32. An output signal on the line 62 from the majority circuit 22 represents a carry $C_3$. The carry $C_3$ is connected to a next stage, not shown, if more stages are employed. Otherwise, the carry signal $C_3$ represents the highest order bit of the sum if no additional adder stages are employed. The carry signal on the line 62 is conveyed to two different points in the majority circuit 32 as explained more fully hereinafter. The output of the majority circuit 32 is a signal which represents a sum $S_2$.

The three input majority circuits 20 through 22 in respective stages 10 through 12 determine the proper carry output in response to associated inputs $A_x$, $B_x$ and $C_x$. A carry output $C_{x+1}$ may be expressed as follows:

$$C_{x+1}=A_xB_x+A_xC_x+B_xC_x \quad (1)$$

It is readily seen from this equation that the carry $C_{x+1}$ is a binary one whenever any two or more of the quantities $A_x$, $B_x$ or $C_x$ are 1. The majority circuits 20 through 22 in stages 10 through 12 provide an output signal which is like the majority of the input signals, and it is readily seen that the output signal properly represents the correct carry output to the next high order stage.

The majority circuits 30 through 32 in respective stages 10 through 12 generate the correct sum in response to the associated inputs. The sum $S_x$ may be expressed as follows:

$$S_x=A_x\bar{B}_x\bar{C}_x\bar{C}_{x+1}\bar{C}_{x+1}+\bar{A}_xB_x\bar{C}_x\bar{C}_{x+1}\bar{C}_{x+1}+\bar{A}_x\bar{B}_xC_x\bar{C}_{x+1}\bar{C}_{x+1}+A_xB_xC_xC_{x+1}C_{x+1} \quad (2)$$

The quantity $C_{x+1}$ in essence performs an inversion function in the five input majority circuit in the stage where the carry output is generated, but the carry output signal does no cause an inversion function to take place in the five input majority circuit to which it is supplied in the next higher order stage. For example, if the carry output signal from the majority circuit 20 in FIGURE 1 is a binary one, it is supplied as a binary one to the majority circuit 31 in stage 11. In stage 10, however, this carry signal of binary one is applied to the five input majority circuit 30 with the same effect as if two binary zeros were applied to the majority circuit 30. In essence the carry signal on the line 43 to the majority circuit 30 causes an inversion of the signal representing the majority of the inputs $A_0$, $B_0$ and $C_0$ in all cases except the one case where $A_0$, $B_0$ and $C_0$ are all alike. Alternatively, the majority circuit 30 provides an output signal which has a polarity the same as the majority of the input quantities $A_0$, $B_0$, $C_0$, $\bar{C}_1$, $\bar{C}_1$ where the input quantity $C_1$ is inverted by the majority circuit 30. In order to demonstrate that the proper binary sum $S_x$ is generated by a five input majority circuit according to the logic expressed in Equation (2) above, the results for each useful combination of the signals $C_x$, $A_x$, $B_x$, $\bar{C}_{x+1}$, $\bar{C}_{x+1}$, $S_x$ and $C_{x+1}$ are illustrated in respective columns 1 through 7 of the table below:

TABLE

| Col. 1, $C_x$ | Col. 2, $A_x$ | Col. 3, $B_x$ | Col. 4, $\bar{C}_{x+1}$ | Col. 5, $\bar{C}_{x+1}$ | Col. 6, $S_x$ | Col. 7, $C_{x+1}$ |
|---|---|---|---|---|---|---|
| 1 | 1 | 1 | 0 | 0 | 1 | 1 |
| 1 | 0 | 1 | 0 | 0 | 0 | 1 |
| 1 | 1 | 0 | 0 | 0 | 0 | 1 |
| 1 | 0 | 0 | 1 | 1 | 1 | 0 |
| 0 | 1 | 1 | 0 | 0 | 0 | 1 |
| 0 | 0 | 1 | 1 | 1 | 1 | 0 |
| 0 | 1 | 0 | 1 | 1 | 1 | 0 |
| 0 | 0 | 0 | 1 | 1 | 0 | 0 |

The majority circuits 20 through 22 and 30 through 32 in FIGURE 1 are operated by pulse signals applied to input lines 70 through 75. The pulses are staggered in time. Clock pulse 1 ($CP_1$) is applied to the input line 70. This clock pulse persists for the duration of the add operation. The next clock pulse $CP_2$ is applied to the input line 71 of the majority circuit 30 of stage 10, and the clock pulse $CP_2$ is applied simultaneously to the majority circuit 21 of stage 11. The clock pulse $CP_2$ persists for the duration of the add operation. Clock pulse $CP_3$ is applied to the input line 73 of the majority circuit 31 in stage 11, and this pulse is applied simultaneously to the input line 74 of the majority circuit 22 in stage 12. The last clock pulse $CP_4$ is applied to the input line 75 or the majority circuit 32 in FIGURE 12. Each of the clock pulses $CP_1$ through $CP_4$ persists until the sum signals $S_0$ through $S_2$ and $C_3$ are stored in a storage device, not shown. As soon as the storage of the sum signals has been accomplished, the clock pulses $CP_1$ through $CP_4$ may be terminated. The polarity of the clock pulses as discussed more fully hereinafter. One suitable arrangement for generating clock pulses having the proper polarity and timing relationship is illustrated in FIGURE 2.

Figure 2:
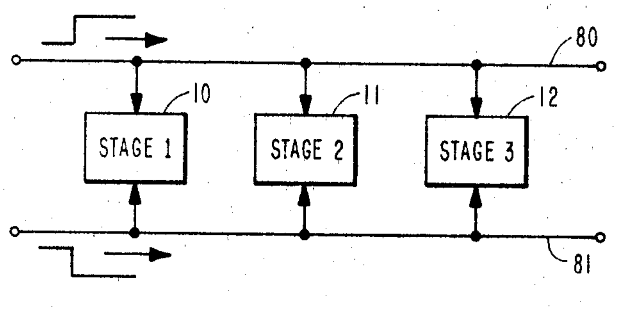
FIGURE 2 shows the use of adder stages with a transmission line.

Referring next to FIGURE 2, stages 10, 11 and 12 of FIGURE 1 are shown connected to a transmission line. The transmission line may be any one of various well known types, but it is illustrated simply as a pair of parallel lines 80 and 81. By appropriately tapping off of the parallel transmission line, pulses of suitable polarity and of the proper timing relationship may be obtained. It is seen that the adder arrangement of this invention is qsasi-asynchronous, and successive stages are tapped off at appropriate points such that the delay from stage to stage is just long enough to allow the inputs to each stage to provide the proper steering currents to the next stage. The time for a full parallel add is the time necessary to propagate carry signals through N stages which is in the order of 20 nanoseconds or less per bit with present day equipment. It is pointed out that FIGURE 2 is merely illustrative of the use of a transmission line for pulse operation of the various adder stages, and it does not depict the actual points on the transmission line from which the various stages are tapped. However, this technology is well developed, and since it constitutes no part of this invention per se, further elaboration is considered unnecessary. Many good texts on this subject matter are available, and one is Pulse Technoques by Moskowitz and Racker, published by Prentice-Hall, Inc., 1951. Note especially Appendix III commencing on page 284.

Figure 3:
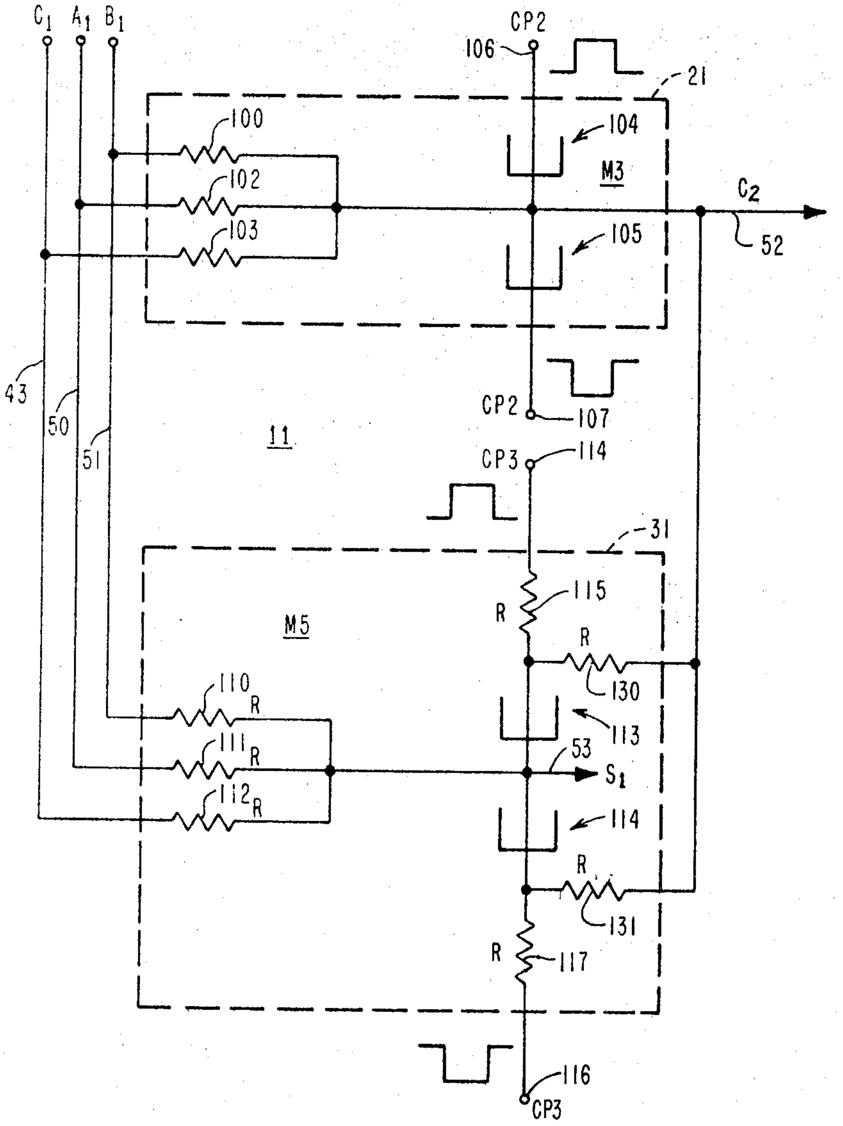
FIGURE 3 illustrates in detail the adder stages shown in block form in FIGURE 1.

Reference is made next to FIGURE 3 for a description of the details of each of the adder stages in FIGURE 1. Since all of the stages in FIGURE 1 are of the same construction, a description of one stage suffices for an understanding of the remaining stages. The stage 11 of FIGURE 1 is arbitrarily shown in FIGURE 3. It illustrates the details of the majority circuits 21 and 31 which are illustrated in block form in FIGURE 1. The majority circuit 21 in FIGURE 3 has three resistors 100, 102 and 103 connected between the respective inputs $B_1$, $A_1$, $C_1$ and the node point between tunnel diodes 104 and 105. The tunnel diode 104 is pulsed with a positive signal through a terminal 106 simultaneously as the tunnel diode 105 is pulsed with a negative signal through a terminal 107. When the tunnel diodes 104 and 105 are energized with respective positive and negative pulses simultaneously, they present a signal at the node which has the same polarity as the majority of the inputs. For example, if a majority of the inputs have positive signals representing binary ones, the output signal on the line 52 is a positive signal representing that the carry $C_2$ is a binary one. If a majority of the inputs $A_1$, $B_1$, $C_1$ are negative signals representing binary zeros, the output signal on the line 52 is a negative signal representing that the carry $C_2$ is a binary zero.

The majority circuit 31 in FIGURE 3 has resistors 110 through 112 connected between respective inputs $B_1$, $A_1$, $C_1$ and the node point of tunnel diodes 113 and 114. The tunnel diode 113 is energized with a positive pulse through a terminal 114, and this signal is supplied through a resistor 115 to the tunnel diode. The tunnel diode 114 is energized with a negative pulse through a terminal 116, and this signal is supplied through a resistor 117 to the tunnel diode. The line 52 from the majority circuit 21 is connected through a resistor 130 to the tunnel diode 113 and through a resistor 131 to the tunnel diode 114. The current representing the carry signal on the line 52 is split and applied equally to the side of each tunnel diode opposite their common junction. Input signals $A_1$, $B_1$ and $C_1$ are applied through the resistors 110 through 112 to the common junction between the tunnel diodes 113 and 114. The resistors 110 through 112 have a resistance value R, and the resistors 130 and 131 have resistance value R. The signal applied on the line 52 through the resistors 130 and 131 to the opposite sides of the tunnel diodes provides an inverse steering current which effects an inversion of the polarity of the majority of the signals $A_1$, $B_1$ and $C_1$ for all cases except when $A_1$, $B_1$ and $C_1$ are all alike. Alternatively, the majority circuit 31 in FIGURE 3 may be viewed as one which inverts the polarity of the carry signal quantity $C_2$ to the quantity $\overline{C}_2$ and provides an output sum $S_1$ which has a polarity the same as the polarity of the majority of the quantities $A_1$, $B_1$, $C_1$, $\overline{C}_2$ and $\overline{C}_2$. Thus it is seen that the output signal on the line 53 from the majority circuit 31 in FIGURE 3 properly represents the sum $S_1$ for all combinations of the inputs $A_1$, $B_1$ and $C_1$.

While the invention has been particularly shown and described with reference to a preferred embodiment thereof, it will be understood by those skilled in the art that various changes in form and detail may be made therein without departing from the spirit and scope of the invention.

What is claimed is:

1. An adder arrangement having a plurality of adder stages with each adder stage including:

first and second majority circuits each having a series circuit including a pair of diodes serially connected with a common point therebetween, first means while supplies binary input signals $A_x$ and $B_x$ and a carry input $C_x$ to the common point of said first and second majority circuits, said first majority circuit responding to the input signals $A_x$, $B_x$ and $C_x$ to develop an output signal which represents a carry $C_{x+1}$, second means which supplies the carry output signal $C_{x+1}$ as an input to the next stage, impedance means connected across the series circuit of said second majority circuit, and third means for supplying the carry output signal $C_{x+1}$ from said first majority circuit to the impedance means in said second majority circuit, said impedance means supplying the output signal $C_{x+1}$ as a double input to said second majority circuit wherein each input signal $C_{x+1}$ has the effect of the equivalent quantity $\overline{C}_{x+1}$ in said second majority circuit, said second majority circuit having an output signal representing a sum $S_x$ the polarity of which is like the polarity of the majority of the signals $A_x$, $B_x$, $C_x$, $\overline{C}_{x+1}$ and $\overline{C}_{x+1}$.

2. The apparatus of claim 1 wherein the first majority circuit and the second majority circuit respond to signals applied thereto and provide an output signal after one unit of time delay, the carry signal $C_{x+1}$ being provided one unit of time delay after the signals $A_x$, $B_x$ and $C_x$ are applied to the first majority circuit and the sum signal $S_x$ being provided two units of time delay after the signals $A_x$, $B_x$ and $C_x$ are applied to the second majority circuit and a pulse generator coupled to the adder stages which operates the adder stages in succession and the first majority circuit of one stage and the second majority circuit of the preceding stage are pulsed simultaneously.

3. The apparatus of claim 2 in which the pulse generator means includes a transmission line which provides pulses for operating the adder stages.

4. The apparatus of claim 2 in which the pulses from the pulse generator are applied across the series circuit in the first and second majority circuits of each adder stage, and pulses of unlike polarity are applied to opposite ends of the series circuit in the first and second majority circuits of each adder stage.

5. An adder arrangement having a plurality of adder stages with each adder stage including:

first and second majority circuits each of which responds to input signals and one unit of time delay thereafter provides an output signal therefrom, first means which supplies binary input signals $A_x$ and $B_x$ and a carry input $C_x$ to said first and second majority circuits, said first majority circuit responding to the input signals $A_x$, $B_x$, and $C_x$ to develop an output signal after one unit of time delay which represents a carry $C_{x+1}$, second means which supplies the carry output signal $C_{x+1}$ as an input to the next stage, third means which supplies the carry output signal $C_{x+1}$ as a double input to said second majority circuit wherein each input signal $C_{x+1}$ has the effect of the equivalent quantity $\overline{C}_{x+1}$ in said second majority circuit, said second majority circuit providing an output signal representing a sum $S_x$ the polarity of which is like the polarity of the majority of the quantities $A_x$, $B_x$, $C_x$ $\overline{C}_{x+1}$ and $\overline{C}_{x+1}$ one unit of time delay after the signal $C_{x+1}$ is supplied as an input thereto, whereby the carry signal $C_{x+1}$ in each adder stage is provided one unit of time delay after the input signals $A_x$, $B_x$, and $C_x$ are applied thereto and the sum signal $S_x$ in each adder stage is provided two units of time delay after the input signals $A_x$, $B_x$, and $C_x$ are applied thereto.

6. An adder having a plurality of stages:

each stage including first and second majority circuits, first means which supplies binary input signals $A_x$ and $B_x$ and a carry input $C_x$ to said first and second majority circuits, said first majority circuit responding to the input signals $A_x$, $B_x$, and $C_x$ to develop an output signal which represents a carry $C_{x+1}$, second means which supplies the carry output signal $C_{x+1}$ as an input to the next stage, third means which supplies the carry output signal $C_{x+1}$ as a double input to said second majority circuit wherein each input signal $C_{x+1}$ has the effect of the equivalent quantity $\overline{C}_{x+1}$ in the second majority circuit, said first and second majority circuits each including a circuit having a first terminal, a second terminal, and a pair of diodes connected in series between the first and second terminals, said diodes having a common point therebetween, resistive means connected between each binary input signal $A_x$, $B_x$, and $C_x$ of the first means and the common point of the diodes in the first and second majority circuits, resistive means connected between the common point of the first majority circuit and the first terminal of the second majority circuit, resistive means connected between the common point of the first majority circuit and the second terminal of the second majority circuit, said second majority circuit having an output signal from the common point representing a sum $S_x$ the polarity of which is like the majority of the binary signals $A_x$, $B_x$, $C_x$, $\overline{C}_{x+1}$ and $\overline{C}_{x+1}$.

7. An adder having a plurality of stages with each stage including:

first and second majority circuits, first means which supplies binary input signals $A_x$ and $B_x$ and a carry input $C_x$ to said first and second majority circuits, said first majority circuit responding to the input signals $A_x$, $B_x$, and $C_x$ to develop an output signal which represents a carry $C_{x+1}$, second means which supplies the carry output signal $C_{x+1}$ as an input to the next stage, third means which supplies the carry output signal $C_{x+1}$ as a double input to said second majority circuit wherein each input signal $C_{x+1}$ has the effect of the equivalent quantity $\overline{C}_{x+1}$ in said second majority circuit, said first and second majority circuits having a pair of diodes connected in series with a common point therebetween, said input signals $A_x$, $B_x$, and $C_x$ being connected to said common point, said second means and said third means being connected to said common point of said first majority circuit to obtain the carry output signal $C_{x+1}$, resistive means connected in series with said pair of diodes in series, and said third means being connected to said resistive means, whereby said second majority circuit provides an output signal representing a sum $S_x$ the polarity of which is like the polarity of the majority of the signals $A_x$, $B_x$, $C_x$, $\overline{C}_{x+1}$ and $\overline{C}_{x+1}$.

References Cited

UNITED STATES PATENTS

| | | | |
|---|---|---|---|
| 2,999,637 | 9/1961 | Curry | 235—175 |
| 3,113,206 | 12/1963 | Harel | 235—176 |
| 3,275,812 | 9/1966 | Coates et al. | 235—173 |

OTHER REFERENCES

W. A. Sauer: How to Achieve Majority and Threshold Logic With Semiconductors, Nov. 29, 1963, pp. 23–25.

MALCOLM A. MORRISON, *Primary Examiner.*

DAVID H. MALZAHN, *Assistant Examiner.*

U.S. Cl. X.R.

235—175